(12) United States Patent
Gauthier et al.

(10) Patent No.: US 6,265,099 B1
(45) Date of Patent: Jul. 24, 2001

(54) ALLOYED AND DENSE ANODE SHEET WITH LOCAL STRESS RELAXATION

(75) Inventors: Michel Gauthier, La Prairie; Michel Armand, Montréal; Karim Zaghib, Longueuil; Sylvain Poirier, Sainte-Julie; Roger Bellemare, Boucherville, all of (CA)

(73) Assignee: Hydro-Québec, Montreal (CA)

( * ) Notice: Subject to any disclaimer, the term of this patent is extended or adjusted under 35 U.S.C. 154(b) by 0 days.

(21) Appl. No.: 09/058,895

(22) Filed: Apr. 13, 1998

(30) Foreign Application Priority Data

Apr. 14, 1997 (CA) .................................. 2202604

(51) Int. Cl.[7] ...................................... H01M 6/12
(52) U.S. Cl. .................. 429/162; 429/231.95; 429/233; 429/241; 429/242; 429/133; 429/128
(58) Field of Search .............................. 429/231.95, 233, 429/236, 241, 242, 145, 133, 162, 128

(56) References Cited

U.S. PATENT DOCUMENTS

| | | | |
|---|---|---|---|
| 4,690,840 | * 9/1987 | Gauthier et al. | ..................... 427/436 |
| 4,925,752 | * 5/1990 | Fauteux et al. | ..................... 429/191 |
| 5,423,110 | * 6/1995 | Gauthier et al. | ........................... 29/2 |
| 5,747,195 | * 5/1998 | Alamgir et al. | ..................... 429/235 |

* cited by examiner

Primary Examiner—Carol Chaney
Assistant Examiner—Angela J. Martin
(74) Attorney, Agent, or Firm—Oblon, Spivak, McClelland, Maier & Neustadt, P.C.

(57) ABSTRACT

An electrochemical generator comprising thin films including a positive electrode and its collector, and a sheet of a host metal intended to later on constitute a negative electrode, as well as an electrolyte which is conductive towards alkaline ions and also a source of alkali ions. The sheet of the host metal has voids whose quantity and arrangement are capable of locally absorbing any lateral expansion of the sheet of host metal and thereby substantially preventing all cumulative change in the plane of the sheet of host metal when there is an initial formation of alloy in the sheet between the host metal and an alkali metal which is brought about by the alkaline ions. A method of manufacturing such a generator is also described.

61 Claims, 16 Drawing Sheets

C:\ACEP2\CANUL3.PCI

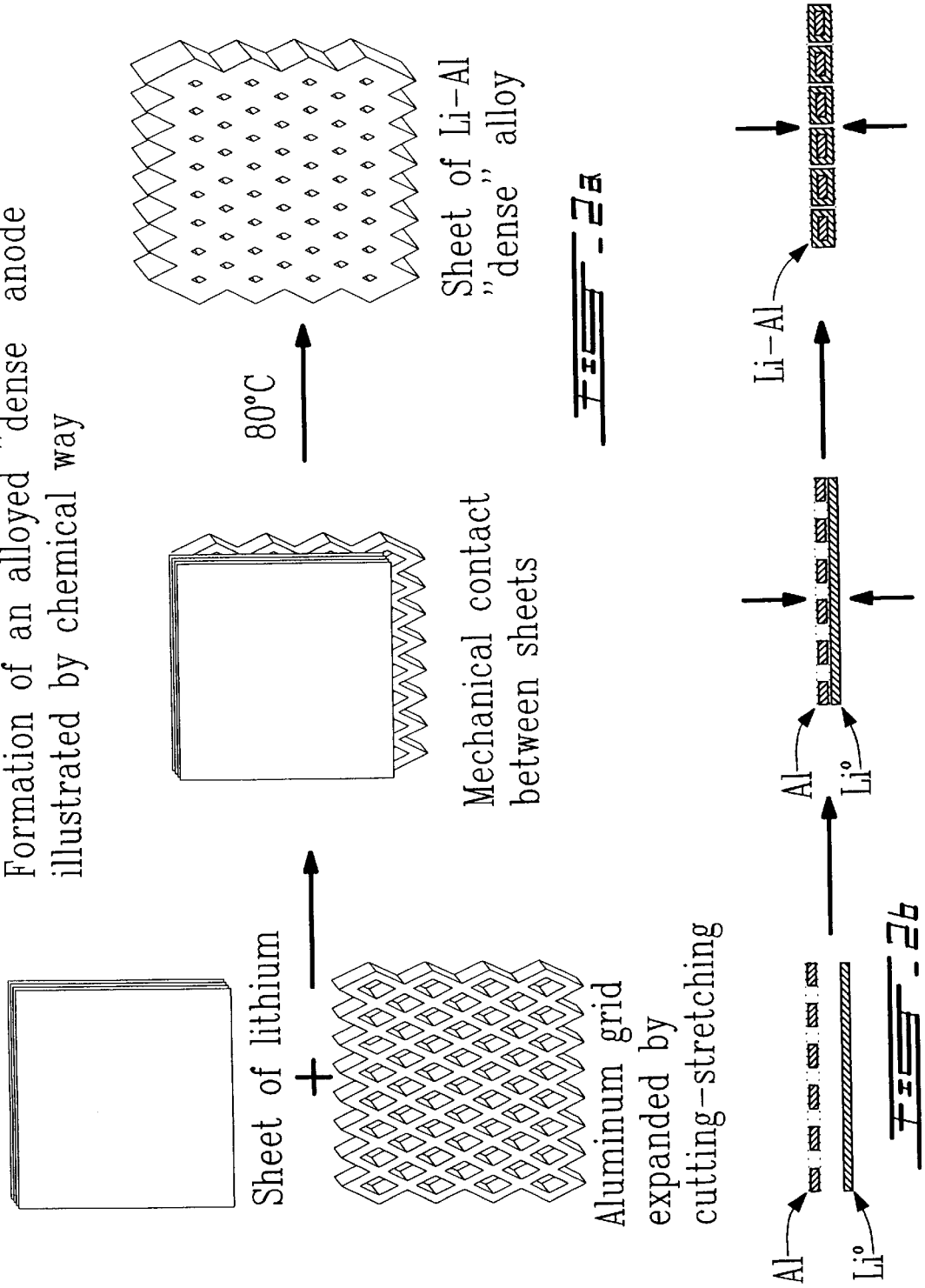

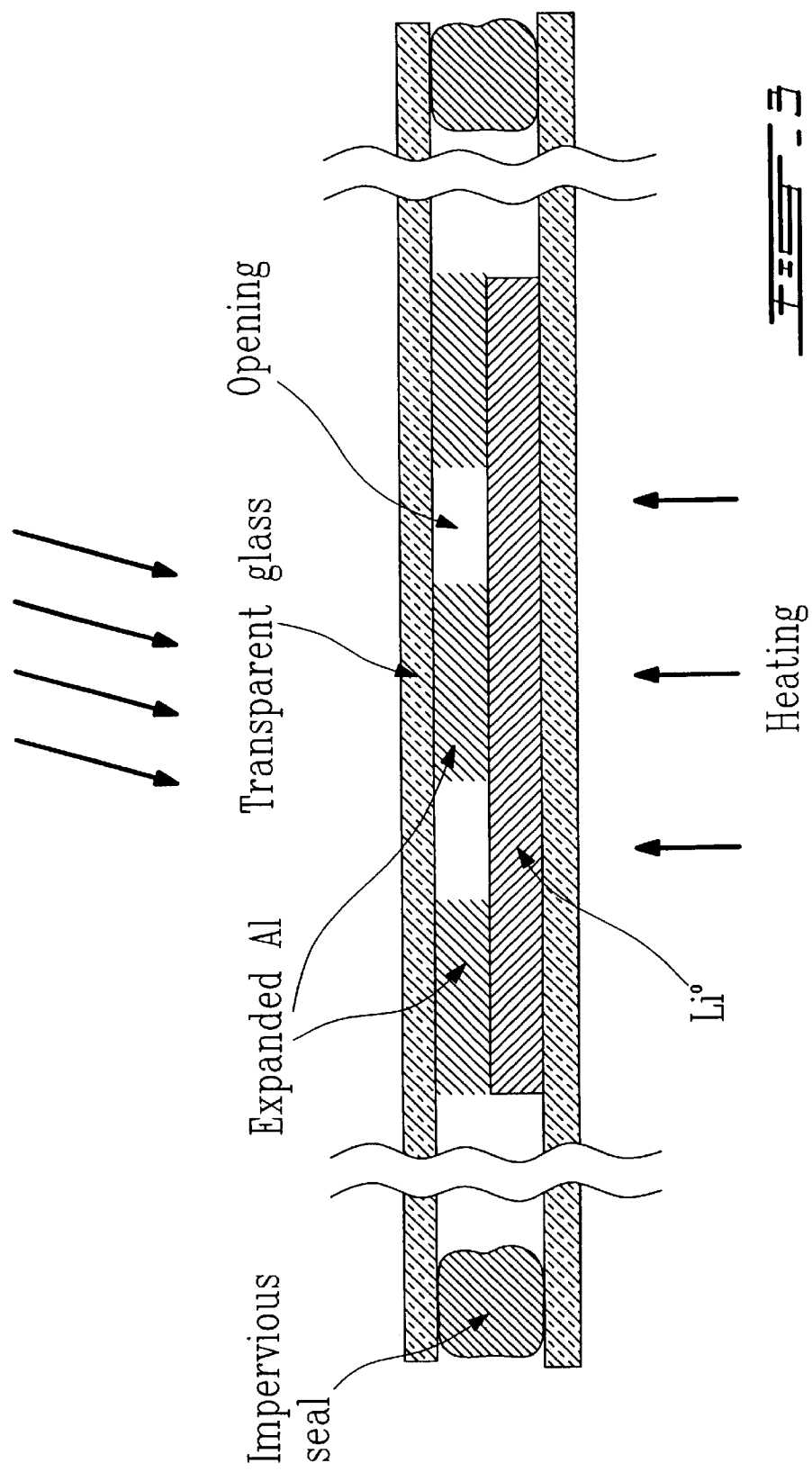

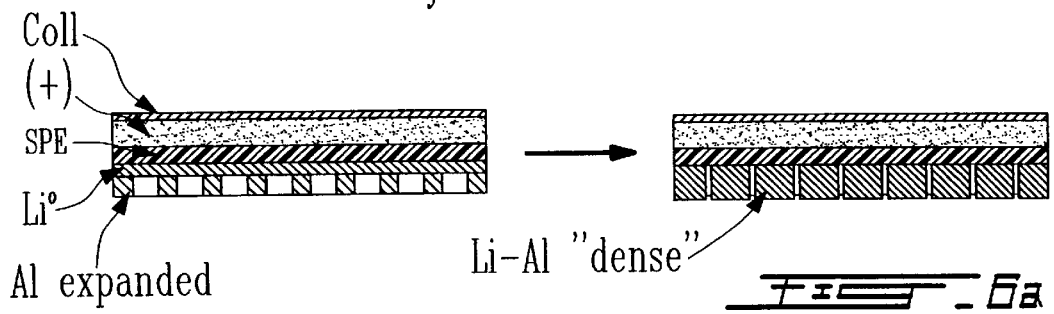
FIG. 6a — Battery with monoface anode
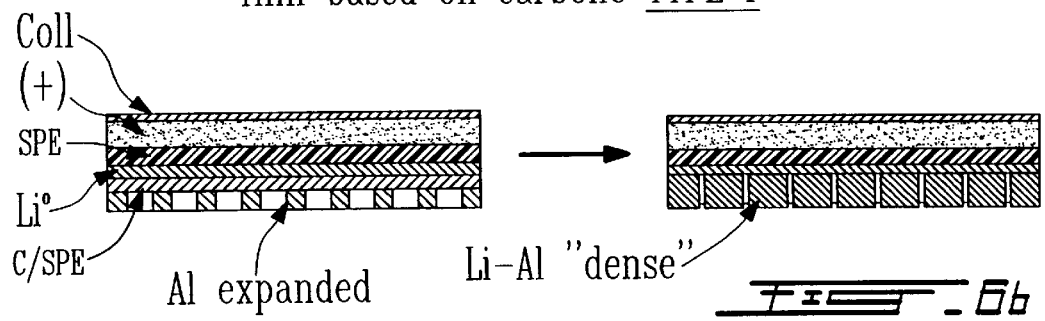
FIG. 6b — Batteries with monoface anode with film based on carbone TYPE I
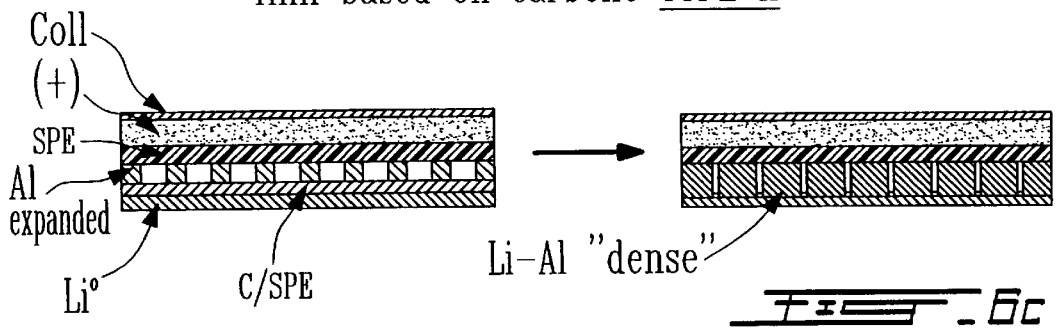
FIG. 6c — Batteries with monoface anode with film based on carbone TYPE II Batteries with monoface anode with film based on carbone TYPE III Battery with biface anode

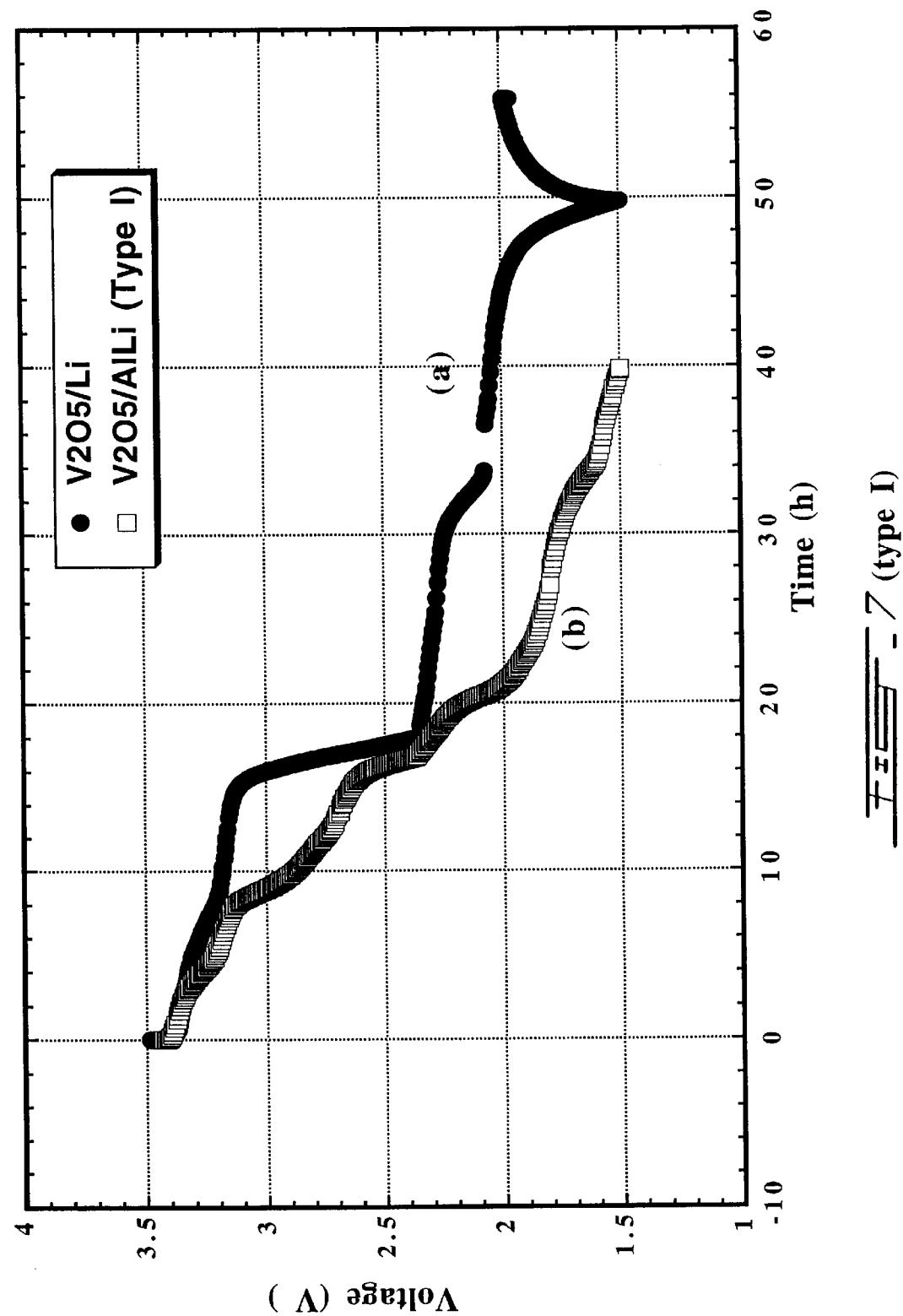
FIG-7 (type I)

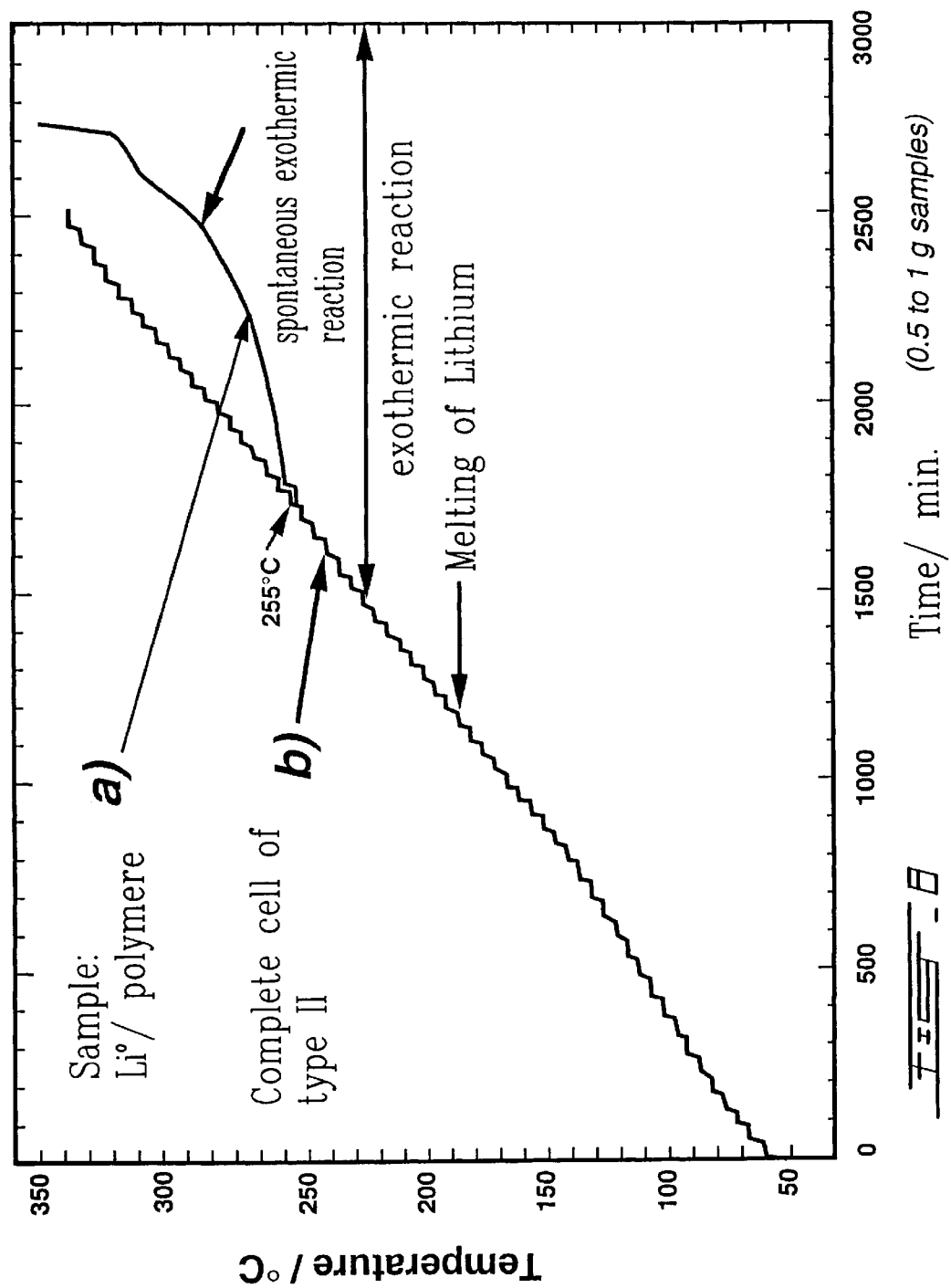

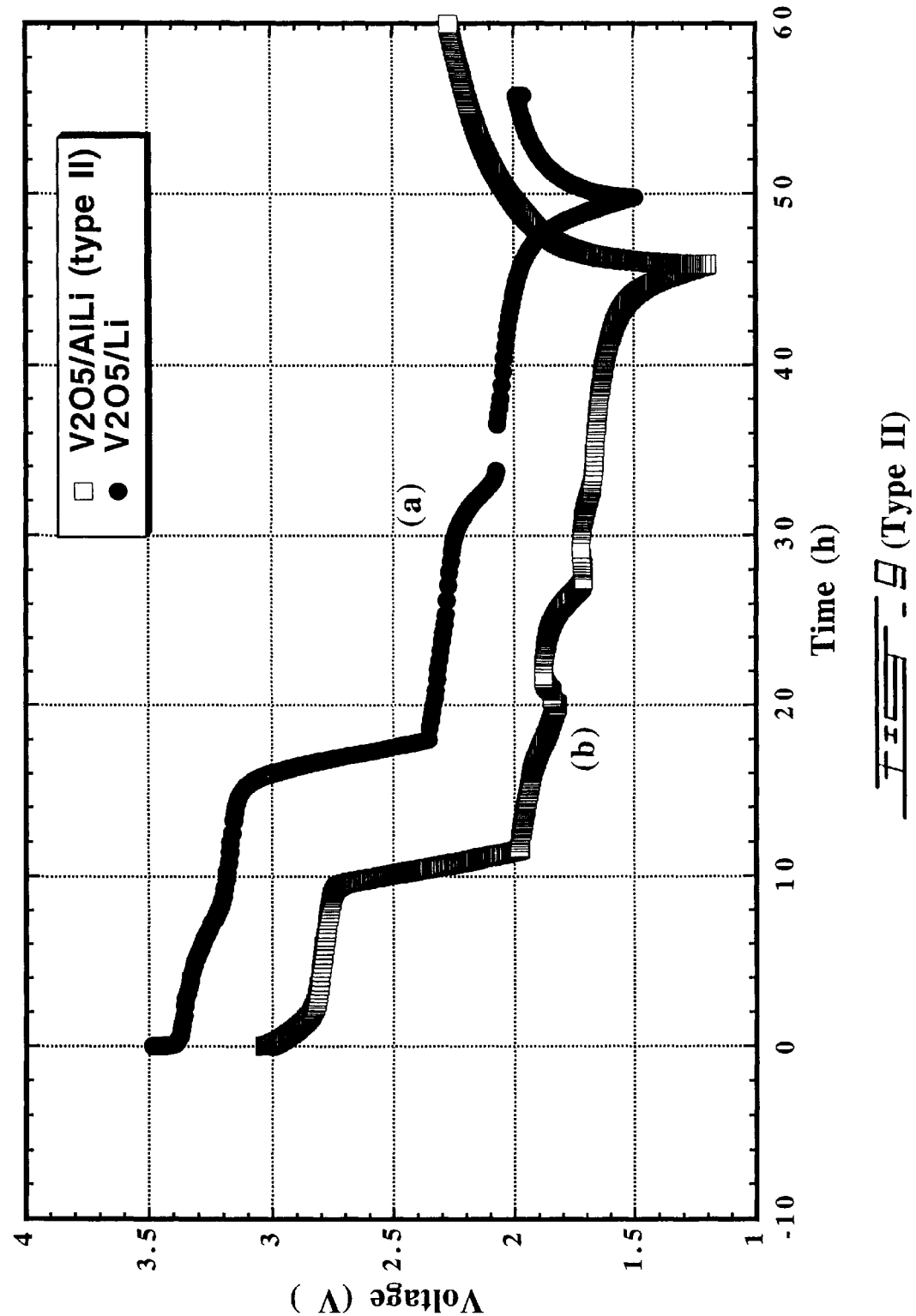
FIG. 9 (Type II)

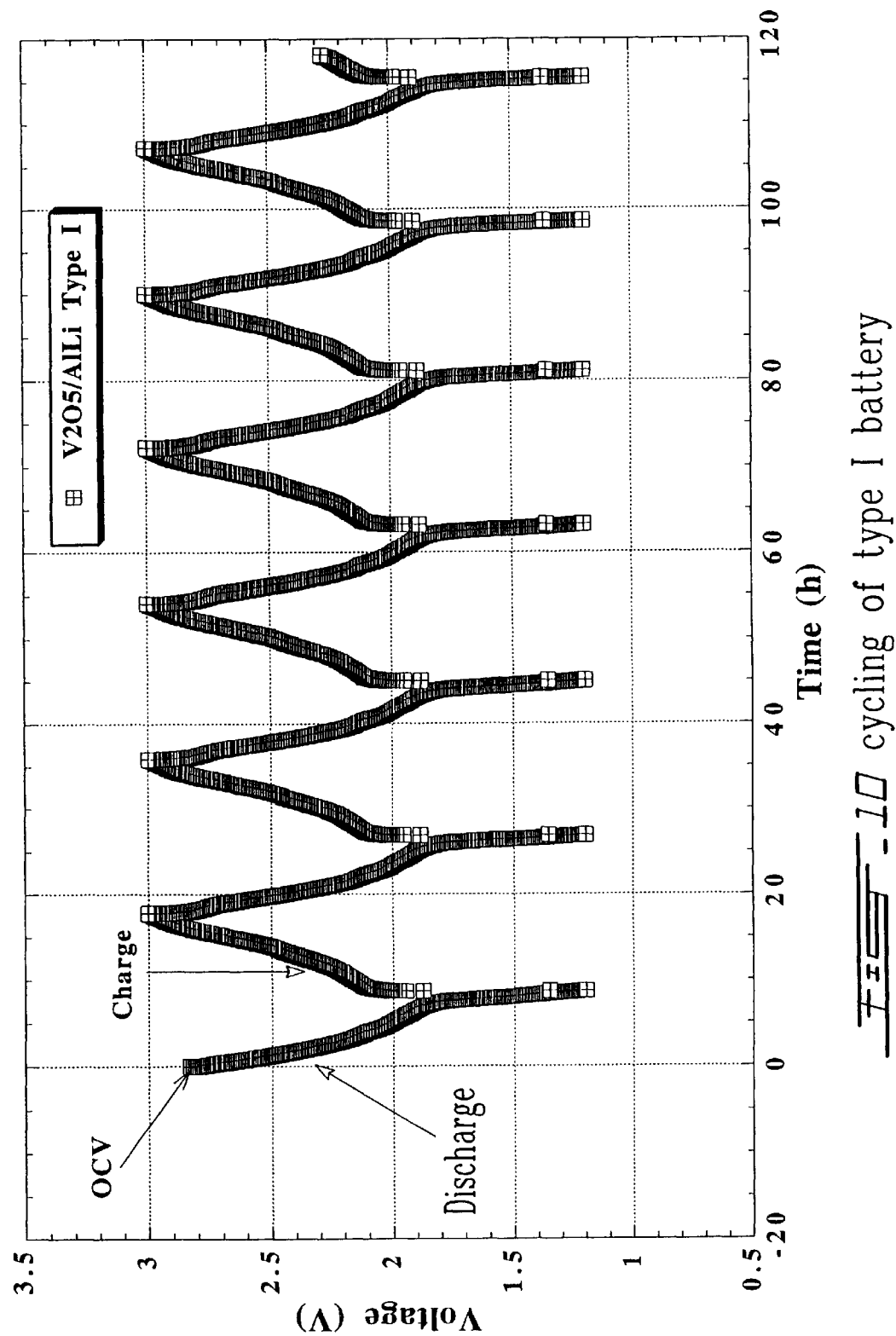
FIG-10 cycling of type I battery

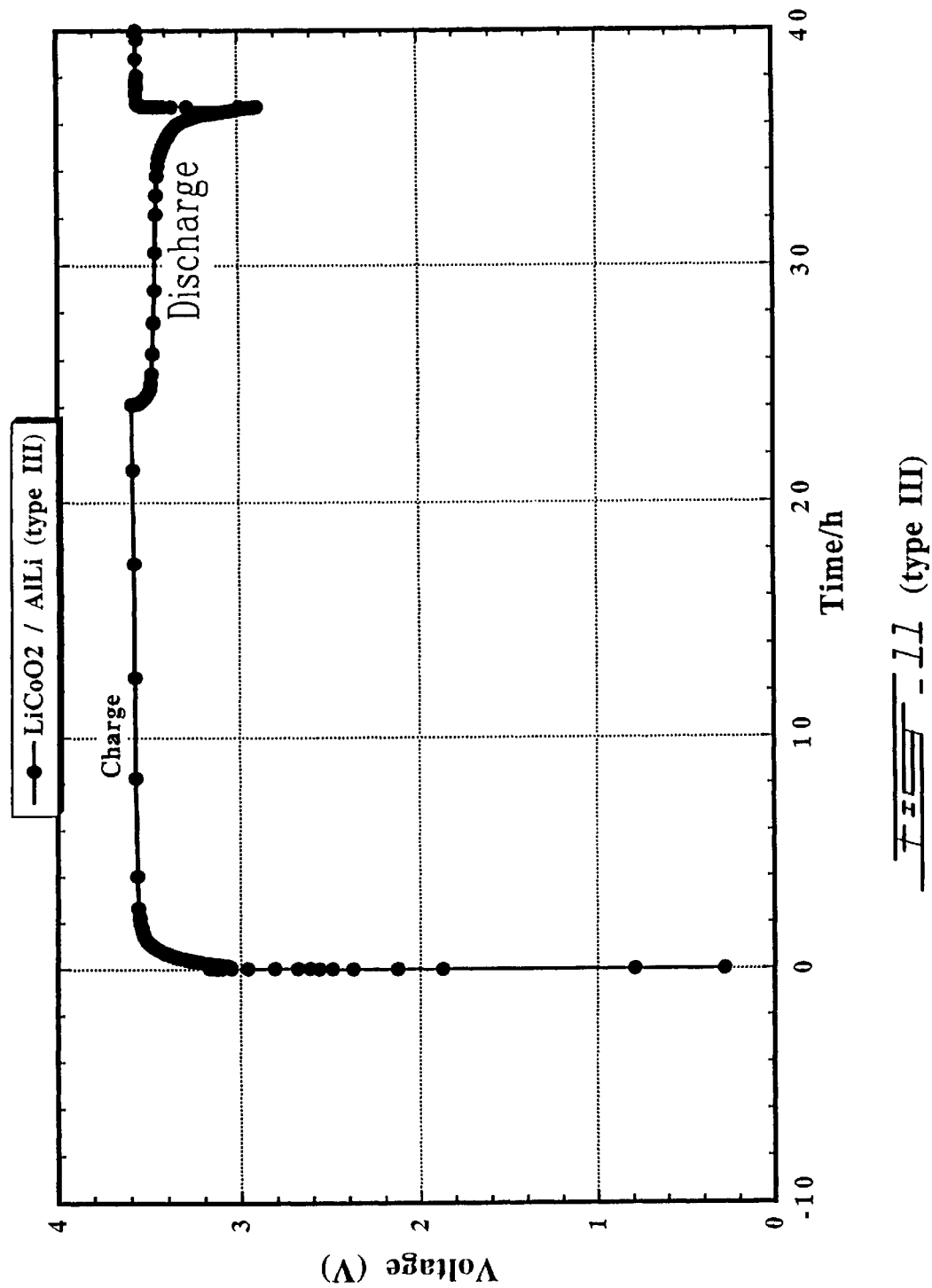
FIG. 11 (type III)

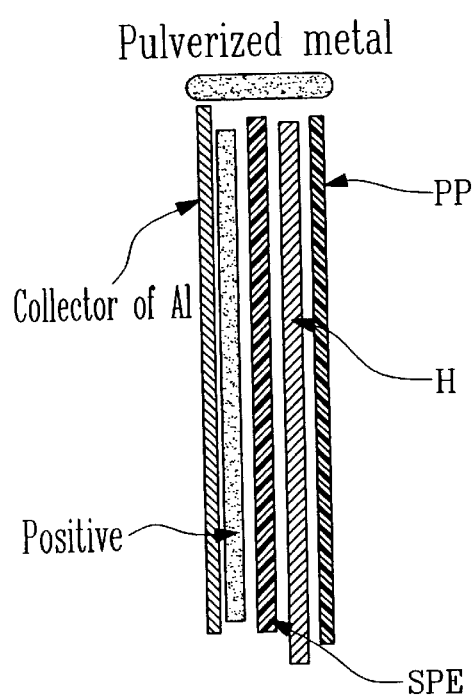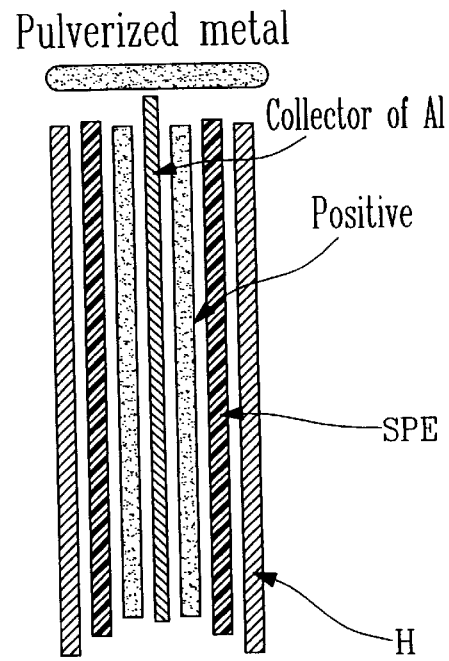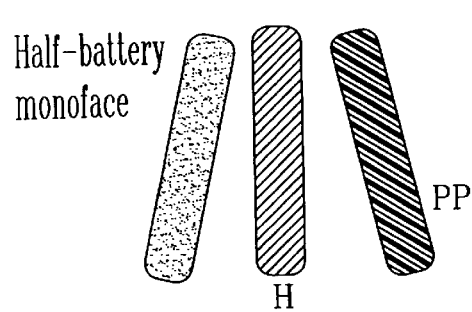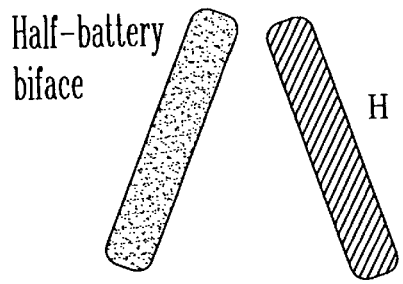
FIG. 12a — Monoface discharged
FIG. 12b — Biface discharged

ALLOYED AND DENSE ANODE SHEET WITH LOCAL STRESS RELAXATION

BACKGROUND OF THE INVENTION a) Field of the Invention

The present invention concerns an alloyed and dense anode sheet with local stress relaxation. More particularly, the invention concerns an electrochemical generator including a negative electrode comprising a sheet of a host metal such as aluminum, lead, silver, silicon, zinc, magnesium, carbon, or combinations thereof, the sheet of host metal being intended to later on constitute a negative electrode and having the property of locally absorbing any lateral expansion and of substantially preventing any change in the plane of the sheet during the formation of alloy between the host metal and the alkali metal, such as lithium.

b) Description of the Prior Art

The more technically advanced generators operating with polymer electrolytes utilize metallic lithium, some time sodium, or other alkali metals, as anode sheets. Alkali metals are malleable and may be used in the form of thin films (CA 2,099,526 and 2,099,524). However, in certain cases of extreme utilization, such as at temperatures higher than 100° C., the use of metallic lithium or other alkali metals may cause the melting of lithium or the alkali metal and the destruction of the electrochemical cell. Moreover, under forced conditions of electrochemical cycling, the formation of dendrites for example of lithium may be induced, for example, when currents of recharge which are too elevated are used, with all the known disadvantages that this implies, while an alloy which operates at a more anodic potential, for example between +300 to 450 mV for lithium aluminum vs lithium, does not cause lithium deposit nor dendritic growth.

The use of alloys of alkali metals such as lithium has been proposed and demonstrated with success in the case of generators operating with molten salts media (U.S. Pat. No. 4,489,143). When operating with an organic medium, and more particularly with a polymer medium, where the thickness of the electrode films are lower than 100 micrometers ($\mu$m) it becomes very difficult to operate with anodes in the form of sheets of alloys. Indeed, intermetallic compounds of lithium which can be used as anodes, such as LiAl, $Li_{21}Si_5$, $Li_{22}Pb_5$ and others are hard and brittle and cannot be laminated as is the case for lithium or weakly alloyed lithium.

It has been shown (CA 1,222,543) that these anodes may be prepared in the form of thin films by producing composites consisting of powders of the intermetallic compound bound by the polymer electrolyte, or still that it was possible under certain conditions to pre-alloy the sheet of host metal of the anode by chemically treating the surface of the sheet (U.S. Pat. No. 4,590,840) or by electrochemically loading part of this sheet (U.S. Pat. No. 4,794,060). However, these techniques which are operational under certain conditions utilize reactive materials, and the pre-inserted alloys are often pyrophoric or give rise to difficulties of operation and optimization of performances. When the anodes are prepared in discharged state, one of the major difficulties to overcome is due to the substantial volume variation resulting from the formation of the alloy which results in important stresses on the structure.

When it is intended to form the alloy from a sheet of host metal containing no lithium during or after assembling a polymer electrolyte generator, the expansion in volume of the structure in the direction of the thickness of the sheets may be compensated by a suitable design of the cell by providing for example for an increase of the total thickness of the superposed sheets, more especially because in the direction of thickness, variation is very small and therefore much more negligible.

The expansion of the host metal in the plane of the sheets is however accumulated along the entire surface of the latter and creates folds enabling to accommodate local stress generated by the expansion. The consequence is that short circuits are formed between the electrodes or that mechanical defects are produced, which harm the operation of a generator. This phenomenon is illustrated in the picture of FIG. 4b in the case of an ordinary sheet of aluminum which is alloyed with lithium in the polymer electrolyte device of FIG. 3. In a true generator, the developed surfaces, the adhesion of the films between one another and the pressure which is maintained on the entire cell prevent any sliding of the host structure to accommodate this lateral expansion.

SUMMARY OF INVENTION

The present invention concerns an electrochemical generator comprising thin films including a positive electrode and it collector, and a sheet of a host metal intended to later on constitute a negative electrode, as well as an electrolyte which is conductive towards alkaline ions, and also means constituting a source of alkali ions, characterized in that the sheet of host metal is provided with voids, the quantity of voids and their arrangement in the sheet of host metal being adapted to locally absorb in the voids any lateral expansion of the sheet of host metal and also to substantially prevent any cumulative change in the plane of the sheet of host metal following an initial formation of alloy in the sheet between the host metal and an alkali metal introduced by the alkali ions.

In a charged state, it should be noted that the generator according to the present invention is characterized in that the sheet is at least in part converted into an alloy of the host metal and of the alkali metal.

According to a preferred embodiment of the invention, the source of alkali ions consists of a sheet of alkali metal which is in contact with the sheet of host metal, the alkali metal originating from the source of alkali ions being alloyed with the host metal when the generator is in charged condition.

According to another embodiment, the source of alkali ions is in the positive electrode, the alkali metal which is obtained from the source of alkali ions and from the sheet of alkali metal being alloyed with the host metal when the generator is in charged condition.

According to another embodiment, the source of alkali ions consists of a sheet of alkali metal which is in contact with the sheet of host metal, and is also found in the positive electrode, the alkali metal which is obtained from the source of alkali ions and from the sheet of alkali metal being alloyed with the host metal when the generator is in charged condition. Preferably, the alkali metal is lithium.

According to another embodiment, the host metal consists of a metal which is capable of producing alloys with highly active alkali metals and in which the diffusion of the alkali metal is rapid. For example, alloys with highly active alkali metal have a potential between 0 and +1.5 volts with respect to the potential of the pure alkali metal. The host metal is preferably selected from Al, C, Sn, Pb, Ag, Si, Zn, Mg or combinations thereof. It is understood that within the context of the present invention, it will be considered that carbon is a metal although this is not strictly the case.

The voids in the sheet of host metal usually represent between about 5 and 80% of the total surface of said sheet of host metal, preferably between about 5 and 30%. They may be in the form of a grid, or in the form of expanded metal which is obtained by stamping—stretching and possibly relaminating.

Preferably, the electrolyte which is conductive towards alkali ions comprises a polymer electrolyte. It may also consist of a polymer matrix, a liquid electrolyte as well as a salt which is at least partially soluble in the liquid electrolyte.

The voids may be present on one only or on both faces of the sheet of host metal where they are in the form of depressions. Preferably, the depressions are obtained by a process of engraving or depressing and wherein the amount of voids represents between about 5 and 80%, preferably between about 5 and 30% of the faces comprising depressions. The depressions are normally arranged so as to substantially compensate for any linear expansion, resulting from the formation of alloy, in the plane of the sheet of host metal.

According to another embodiment, the sheet of host metal includes a layer of polymer electrolyte on at least one of its faces, the layer being disposed on the sheet of host metal so as to maximize ionic exchanges between the alloy and the electrolyte which is conductive towards alkali ions, the latter acting as a separator between the negative electrode and the positive electrode.

The polymer electrolyte may contain carbon distributed therein so as to act as an additive of electronic conduction, in order to maximize ionic exchanges and electronic exchanges.

The sheet of lithium may be located on only one side of the sheet of host metal. It may also be located on both sides of the sheet of host metal.

The alloy is generally obtained when assembling the generator. It may also be obtained during a reaction of activation which follows the assembly of the generator.

According to another embodiment, the sheet of lithium is placed on the sheet of host metal which is opposite the positive electrode, so as to delay the formation of alloy after assembling the generator and to maximize the security of the procedures for assembling the generator. Preferably, the host metal is in excess quantity with respect to the alkali metal so as to leave part of the host metal in a non reacted state thereby enabling the latter to act as a current collector on the plane of the sheet of host metal.

Normally, the generator according to the invention consists of films which are cylindrically or flat wound, or stacked flat. Moreover, the sheet of host metal and the collector of the positive electrode should preferably protrude on both sides of the cylindrically or flat wound, or stacked flat films so as to permit an efficient current connection on the entire lateral edge respectively of the collector and the sheet of host metal. Current connection is obtained for example by pulverizing a conductive metal along the entire lateral edge of the sheets.

According to another embodiment, the negative electrode comprising a sheet of alloy is obtained after assembling the generator by heat treatment of the sheet of host metal and the sheet of alkali metal which is in contact with the sheet of host metal, the heat treatment being carried out under pressure or by mechanical confinement and under conditions ensuring that the sheet of negative electrode remains flat.

Preferably, the host metal has a thickness between about 1 and 150 µm, more particularly between about 10 and 100 µm.

The invention also concerns a method of making an electrochemical generator which comprises preparing thin films including a positive electrode and its collector, and a sheet of a host metal intended to later on constitute a negative electrode as well as an electrolyte which is conductive towards alkali ions, and also means constituting a source of alkali ions, and disposing the negative electrode and the sheet on both sides of the conductive electrolyte, wherein the sheet is selected from a sheet of host metal having voids, the quantity of voids and their arrangement in the sheet of host metal being adapted to locally absorb in the voids any lateral expansion of the sheet of host metal thereby substantially preventing any cumulative change in the plane of the sheet of host metal when there is initial formation of alloy in the sheet between the host metal and an alkali metal which is brought about by the alkali ions, and thereafter assembling the films, the conductive electrolyte and the source of alkali ions so as to constitute the generator.

The present invention therefore resides for example in the formation of a sheet of an alloyed anode, preferably obtained during assembly of the generator, and derived from the perforated sheet of host metal and a source of lithium. Formation of the alloy is preferably carried out when assembling the generator or during a later stage of conditioning the alloy. The processes which are preferably used consist in a chemical treatment of a host metal from a sheet of metallic lithium or, in an electrochemical charge of the host metal, starting from a cathode which is preferably alloyed with lithium, for example, containing $LiCoO_2$, $Li_2Mn_2O_4$ (U.S. Pat. No. 5,425,932).

The main input of the invention consists in utilizing a perforated sheet of host metal so as to enable to "locally" absorb mechanical stress on the structure of the sheet and on its environment which results from the voluminal expansion associated with the formation of the alloy. A non-limiting example of a host structure of aluminum which can be used is illustrated in FIG. 1 in the case of a product which is commercially available under the name EXMET® and is currently used as an inert current collector in certain batteries. It has been observed that these collectors may also have the property which is sought for in the present invention. Their new use as well as good operation as an anode in polymer electrolyte generators, especially with respect to cycling and security, has also been established. The quantity of openings in the presently available products is very high, for example close to 50% of the surface is perforated, such as illustrated in FIG. 1, for a sheet 25 micrometers thick. This percentage of openings may be reduced so as to form an anode surface which in practice is full after formation of the alloy.

Of course, other structures which can reproduce the characteristics of the invention are possible, such as those obtained, for example, by engraving designs formed in a sheet by mechanical processes or the like. The arrangement of the perforations and/or voids, their dimension and the volume percentage of the sheet are selected so as to absorb the volume expansion of the host metal in the plane of the sheet, to optimize the density of the alloyed sheet after reaction and to preserve a flat surface of the alloyed sheet. FIGS. 2a and 2b of the invention illustrate what happens to the host metal during formation of the alloy.

One of the advantages of the present invention is also its ease of operation and its safety characteristic due to the fact that the alloy is in a dense form (non-composite) and is preferably formed after operating the generator. Moreover, the invention contributes to optimize the density of the voluminal energy due to the presence of dense zones, and the power of the generator by controlling the void ratio and providing for the optional presence of a polymer in residual spaces of the sheet of anode after formation of the alloy and expansion of the structure. Another beneficial aspect of the invention, when it is used with polymer electrolytes, is to minimize the rate of penetration of the polymer electrolyte in the dense parts of the anode, thus preserving the quality of the electrical contacts in the alloyed structure. As a matter of fact, since the polymer does not penetrate the alloy, it cannot isolate particles of the latter.

An advantageous way of operating the invention consists in controlling the quantity of lithium in the source, so that after formation of the alloy, part of the host metal remains non-reacted to act as a lateral collector in the plane of the sheet.

A simple way to operate the anode of the invention consists of applying the EXMET® previously described against a sheet of lithium of predetermined thickness. The essential part of this operation is illustrated in FIGS. 2a, 2b and 3 and will be described in detail in the examples which follow. Of course, the number of perforations, the manner of producing the voids and their geometrical shape for optimizing the density of the alloyed sheet and absorbing the stress locally generated by formation of the alloy may vary depending on the nature of the host metal and the intended density of energy, and as a function of other parameters which are known to one skilled in the art. By way of illustration, Table I and FIG. 13 illustrate the essential properties of a certain number of possible host compounds as well as the variations of volume resulting from the formation of the equivalent alloy of lithium, in order to optimize the number of perforations.

Generally, but without limitation, the number of perforations will vary between 5 and 80%, preferably between 5 and 30%, so as to obtain a sheet which is substantially dense and flat and whose electrochemical and safety performances will be optimal. In practice, the quantity of host metal with respect to the quantity of metallic lithium is generally adjusted so as to leave an excess of the former, so that it may act as a current collector for the anode in the plane of the sheet.

For certain metals such as aluminum, it has been observed that the use of a thin film of a carbon composite on the surface of the host metal facilitates a uniform formation of alloy, for example with respect to the quality of the electronic contacts.

Depending on the type of generator which is intended to be obtained, one or two sheets of lithium will be used for a central sheet of the host metal, or vice versa, two sheets of host metal for one sheet of lithium.

As illustrated in FIG. 12a, a preferred manner of obtaining the electrochemical generator consists in co-winding the sheets of the cathode (collector and composite cathode) and of the electrolyte with the anode in the form of a sheet of host metal and a sheet of lithium, and in a monoface system, with an insulating plastic film such as a polypropylene.

FIG. 12b is a preferred manner of obtaining the electrochemical generator which consists in co-winding the sheet of the cathode (collector and composite cathode) and of the electrolyte with the anode in the form of a sheet of the host metal and two sheets of lithium in a biface system. In this assembly, the respective sheets of the cathode (collector) and the anode (host metal protruding from the lithium) protrude on both sides of the winding so as to enable the collection of the electrodes on the entire edge of each protruding sheet. A pulverized metal may then be applied at the ends of the winding so as to insure an optimum electrical and thermal exchange.

BRIEF DESCRIPTION OF DRAWINGS

The invention is, on the other hand, illustrated by the annexed drawings given without limitation, in which

FIG. 2a is a perspective schematic illustration of the formation of an alloyed electrode according to the present invention;

FIG. 2b is a cross-section view of the illustration represented in FIG. 2a;

FIG. 3 is a vertical cross-section view of an experimental device enabling an optical observation in situ of the formation of an alloy from a sheet of lithium and a host structure of expanded aluminum;

FIG. 6a is a schematic vertical cross-section illustrating the manufacture of a generator according to the invention with a monoface anode battery;

FIG. 6b is a schematic illustration which is identical to that of FIG. 6a except that it is concerned with a monoface anode battery with a film based on carbon of type I;

FIG. 6c is a schematic illustration which is similar to that of FIG. 6a except that it is concerned with a monoface anode battery with a film based on carbon of type II;

FIG. 7 is a graph of curves comparing the initial discharges of a conventional lithium generator and a generator according to FIG. 6b;

FIG. 8 is a graph dealing with the compared stability by the ARC technique for a conventional generator and a generator according to the present invention;

FIG. 9 is a graph similar to that of FIG. 7 except that the generator is the one of FIG. 6c;

FIG. 10 is a graph illustrating the cycling curves of a generator illustrated in FIG. 6b;

FIGS. 11 and 11a are graphs showing the cycling curves of a generator illustrated in FIG. 6d.

FIG. 12a is a perspective schematic illustration of the assembly of a battery wound flat in monoface mode in discharged state according to the invention;

FIG. 12b is another schematic illustration of the assembly of a battery wound flat in biface mode in discharged state according to the invention.

DESCRIPTION OF PREFERRED EMBODIMENTS

Figure 1:
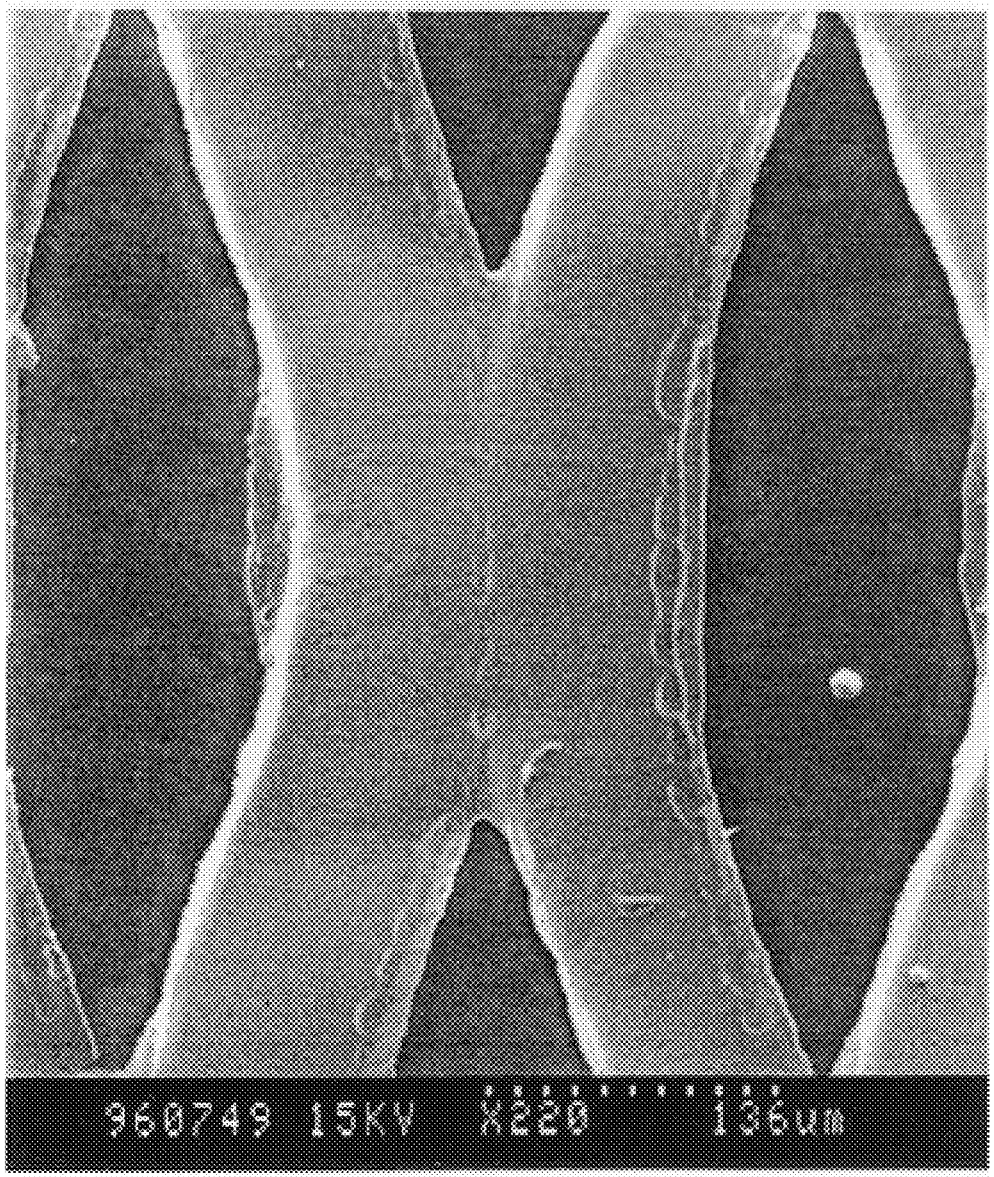
FIG. 1 is a reproduction of a full picture taken with a scanning electron microscope, in the scale x220, of an expanded sheet of aluminum of the type EXMET®.

In FIG. 1, the expanded aluminum is 25 micrometers thick and was cut, stretched and flattened.

Now referring to FIGS. 2a and 2b, this is an illustration of the principle of chemically operating a "dense" alloyed negative electrode with local stress relaxation. FIG. 2a shows the sequence of the operations of the formation of the alloyed sheet; FIG. 2b shows the behaviour in cross-section of the expanded sheet during formation. In this example, a pressure is maintained between the sheet of expanded aluminum and the sheet of lithium so as to ensure that there is contact between the sheets and to prevent a deformation of the surface of the sheets. A temperature rise induces a rapid formation of the alloy which may for example be obtained with the device of FIG. 3.

Having reference to FIGS. 6a to 6e, the collector which is illustrated is generally an ordinary sheet of aluminum, SPE represents the polymer electrolyte, and C designates a thin film of carbon which is dispersed in a bonding polymer electrolyte. (+) represents a composite cathode formed of the charged active material, carbon and a bonding polymer electrolyte. H represents the sheet of host metal (Al) expanded before formation of the alloy LiAl. In more detail, this is illustrated as follows:

FIG. 6a: a battery monoface according to the sequence:
Al collector(+)/SPE/Li°/H FIG. 6b: battery with monoface anode with composite film C of Type I
Al collector(+)/SPE/Li°/C/H FIG. 6c: battery with monoface anode with composite film C of Type II
Al collector(+)/SPE/H/C/Li°

Figure 6D:
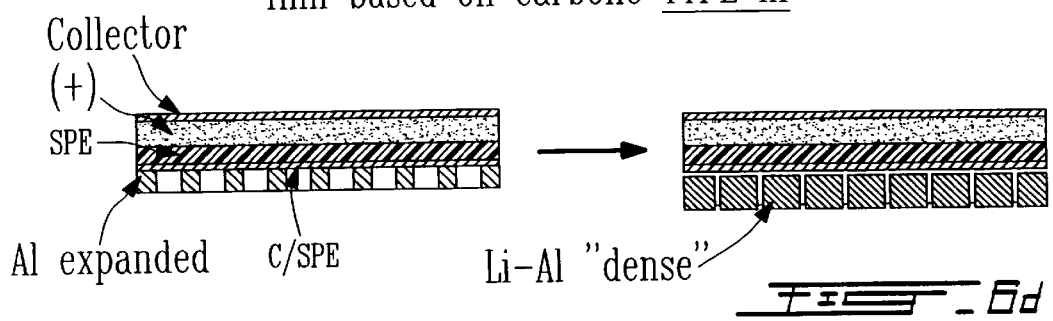
FIG. 6d is a schematic illustration which is similar to that of FIG. 6a except that it is concerned with a monoface anode battery with a film based on carbon of type III.
Figure 6E:
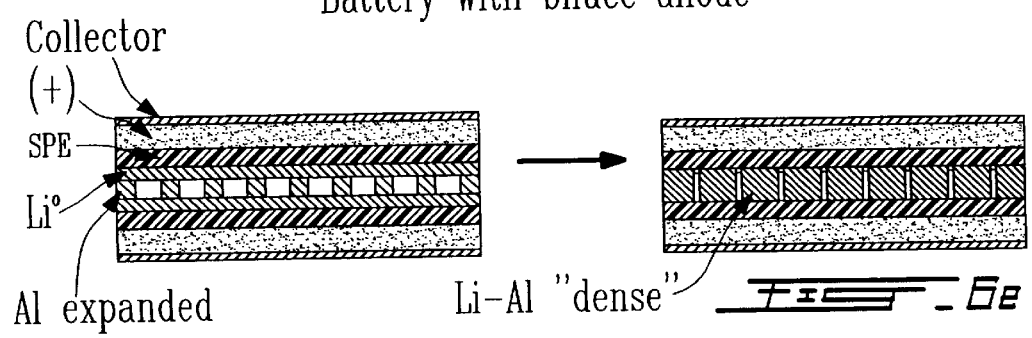
FIG. 6e is a schematic illustration which is similar to that of FIG. 6d except that it is concerned with a biface anode battery.

FIG. 6d: battery with monoface anode prepared in discharged state, with composite film C of Type III
Al collector/LiCoO$_2$/SPE/C/H FIG. 6e: battery with biface anode according to the sequence:
Al collector(+)/SPE/Li°/H/Li°/SPE/(+)/Al collector With respect to FIG. 7, the curves of compared initial discharges relate to the following batteries:
a) Al collector/(V2O5)/SPE/Li° and
b) Al collector/(V$_2$O$_5$)/SPE/Li°/C/H where H=Al in the form of EXMET® of Type I.

With respect to FIG. 8, the stability tests are concerned with the following batteries:
a) SPE/Li°
b) Al collector/(V$_2$O$_5$)/SPE/H/C/Li° where H=Al in the form of EXMET®.

In FIG. 9 the curves of compared initial discharges are those of the batteries:
a) Al collector/(V$_2$O$_5$)/SPE/Li° and
b) Al collector/(V$_2$O$_5$)/SPE/H/C/Li° where H=Al in the form of EXMET® of Type II.

FIG. 10 shows cycling curves for a battery of Type I described in Example 3 and in FIG. 6b.

Figure 11A:
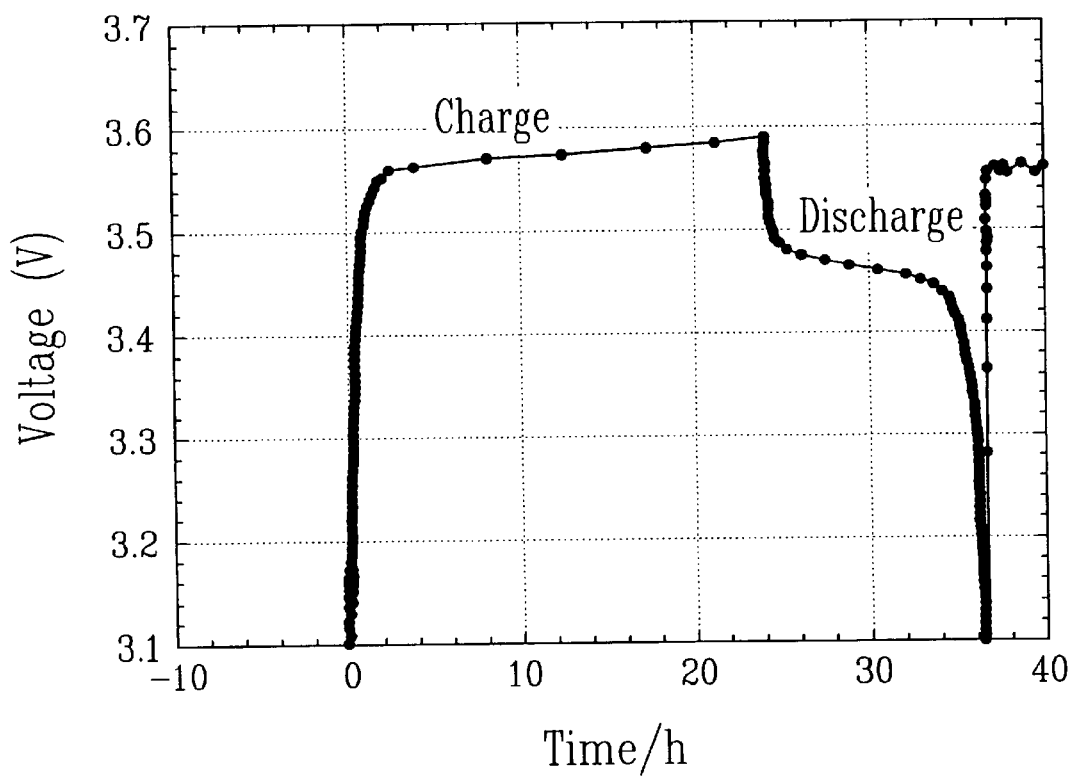
Figure 13:
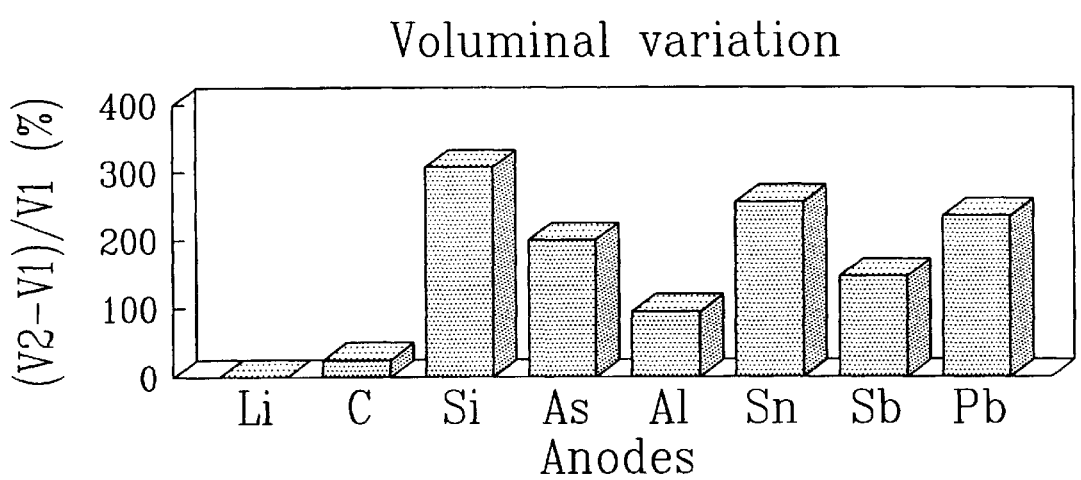
FIG. 13 is a graph showing the voluminal expansion of different alloys.

FIG. 11 shows cycling curves of the following battery:
Al collector/LiCoO$_2$/SPE/C/H where H=Al in the form of EXMET®.

FIG. 12a is a schematic illustration of the assembly of a battery wound flat in biface mode and whose anode is formed from expanded aluminum coated with carbon and with two sheets of metallic lithium joined side by side.

FIG. 12b is a schematic illustration of a battery wound flat in biface mode in discharged state and whose anode is formed from expanded aluminum coated with carbon and two sheets of metallic lithium joined together and in which the excess of host metal is used as a collector for the sheet of anode and whose non-alloyed host structure laterally protrudes at one end of the winding. In this figure, the lateral protrusions of the aluminum collector of the cathode of the host sheet of anode are collected by pulverizing metallic contacts.

The invention will now be illustrated by means of the examples which follow, given by way of illustration but without limitation.

EXAMPLES

Example 1

Figure 4A:
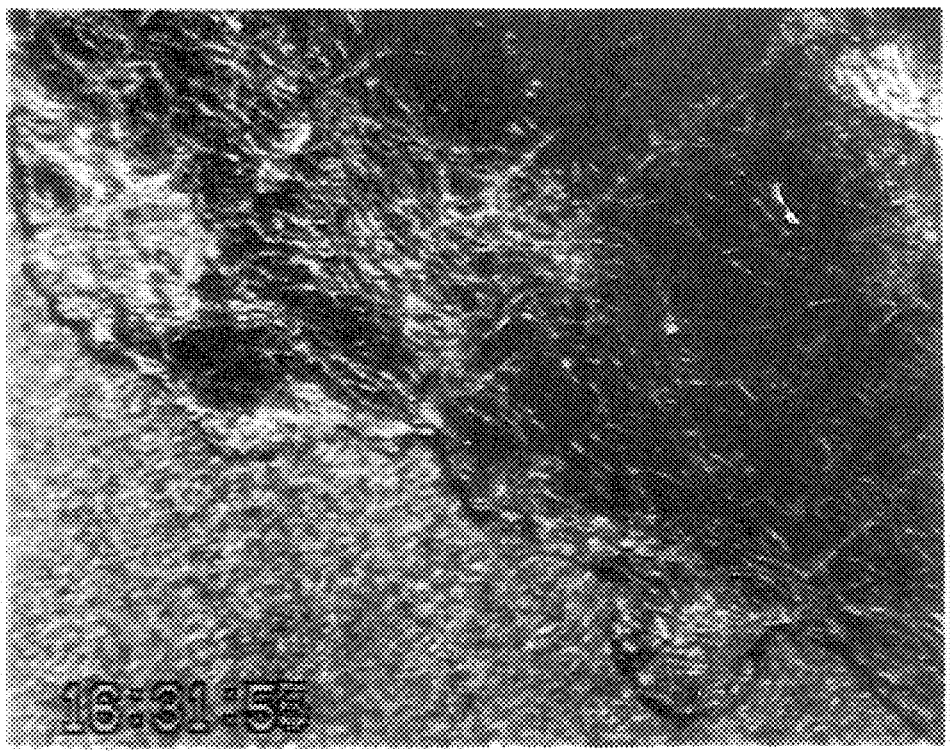
FIG. 4a is a reproduction of a picture illustrating the aspect of a sheet of aluminum (full surface) and of a sheet of lithium mechanically applied on the sheet of aluminium by means of the device illustrated in FIG. 3, before formation of alloy.
Figure 4B:
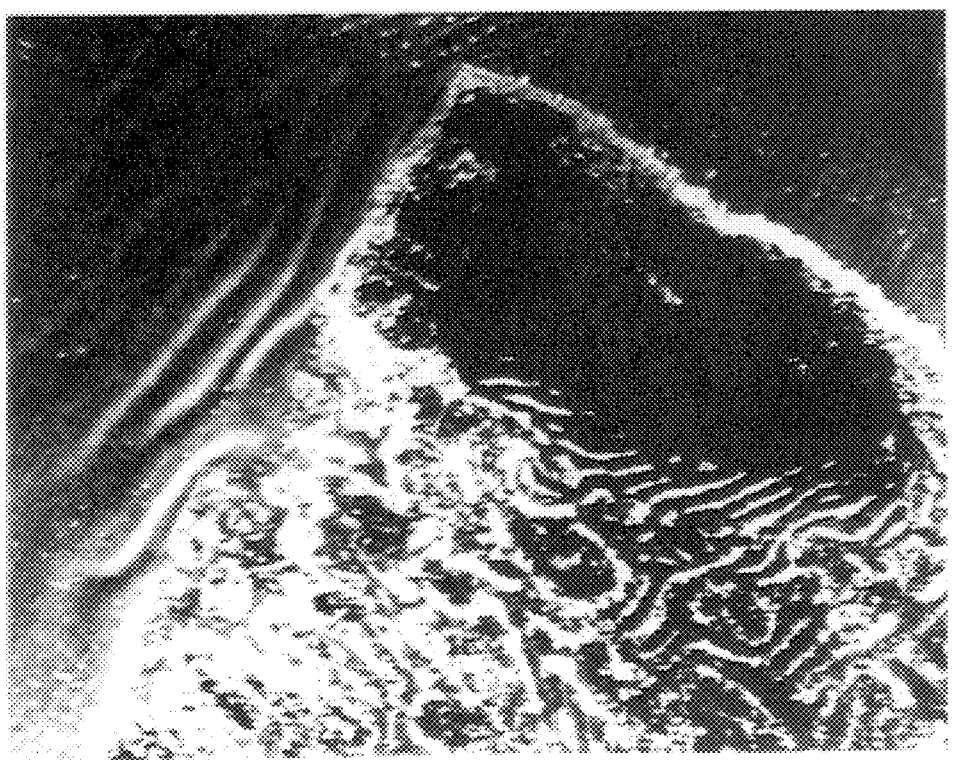
FIG. 4b is a reproduction of a picture according to FIG. 4a except that it was taken after formation of the alloy and disappearance of lithium by chemical reaction at 80° C.

This example illustrates the performance of a normal sheet of aluminum 20 micrometers thick when in contact with a sheet of metallic lithium 18 micrometers thick. The superimposed sheets are illustrated at the start of the test illustrated in FIG. 4 and prepared with the device of FIG. 3.

After heating at 80° C. for one hour, it is observed that the sheet of lithium is dissolved by reaction with aluminum and that the latter has formed a plurality of folds which protrude from the plane of the sheets as a result of a lateral expansion resulting from the formation of the alloy. In a complete battery with polymer electrolyte, this phenomenon generally results in the production of short circuits.

Example 2

In this example, the test of Example 1 is reproduced by replacing the sheet of dense aluminum with a sheet of expanded metal commercially produced by the Company EXMET of Naugatuck, Conn., U.S.A. To facilitate a complete reaction of lithium with the alloy of aluminum, the latter was covered with a thin film of composite C. The aluminum used was 25 micrometers thick once flattened. The perforated surface represents about 50% of the total surface of the sheet and the width of the openings was about 145 micrometers. In this example, the proportion of the openings is too high to permit a complete closing of the alloyed structure after reaction.

Figure 4C:
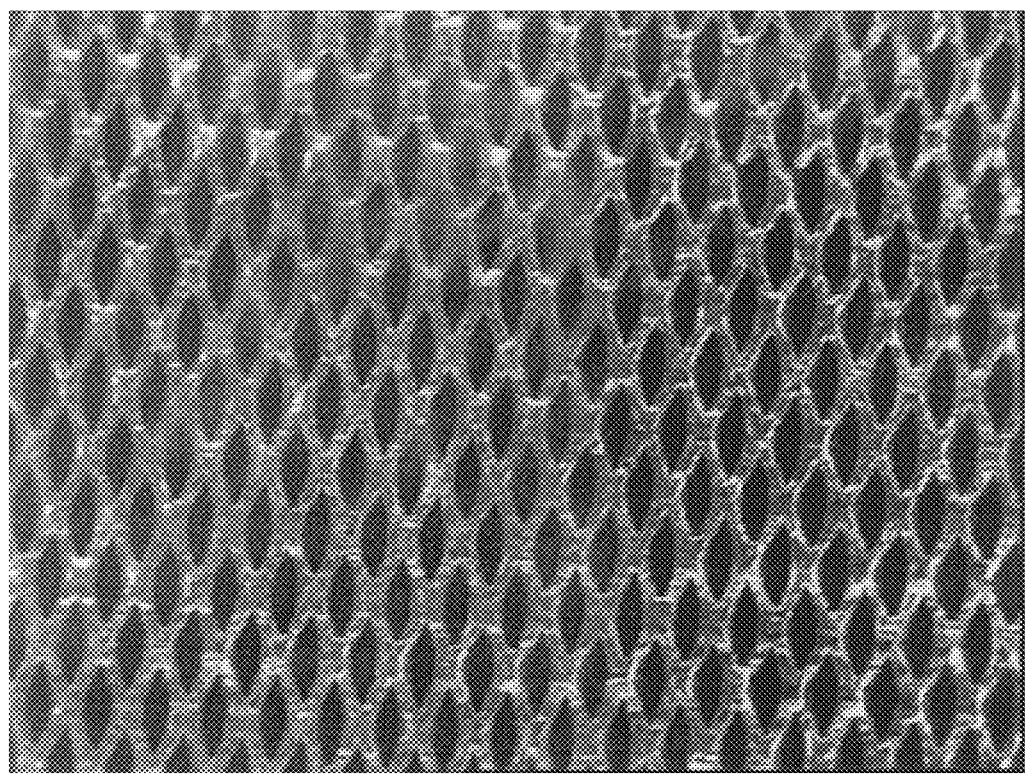
FIG. 4c is a reproduction of a picture illustrating the aspect of a sheet of expanded aluminum and a sheet of lithium by means of the device according to FIG. 3, after formation of the alloys.
Figure 5A:
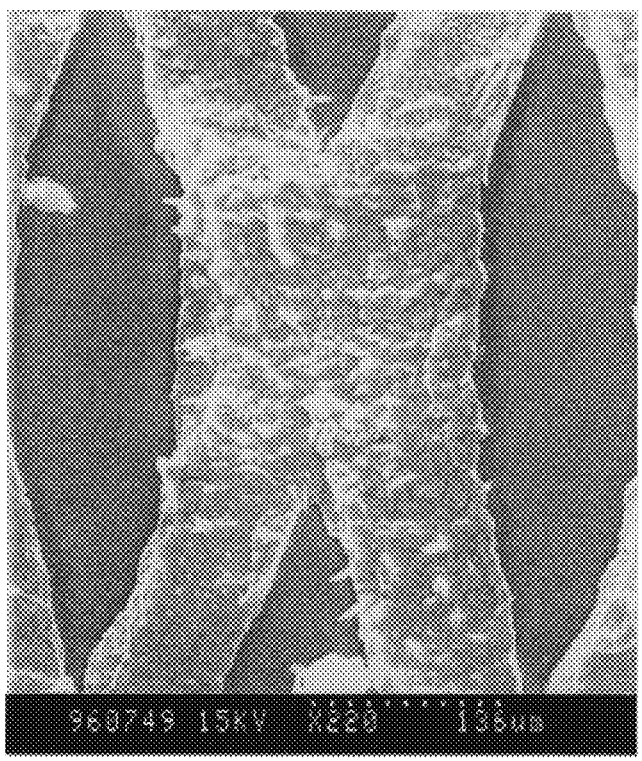
FIG. 5a is a precise reproduction of a picture taken with a scanning electron microscope showing the detail of a sheet of EXMET® identical to that illustrated in FIG. 1, after heating a sheet of expanded aluminum with a sheet of lithium at 80° C., in a device illustrated in FIG. 3.
Figure 5B:
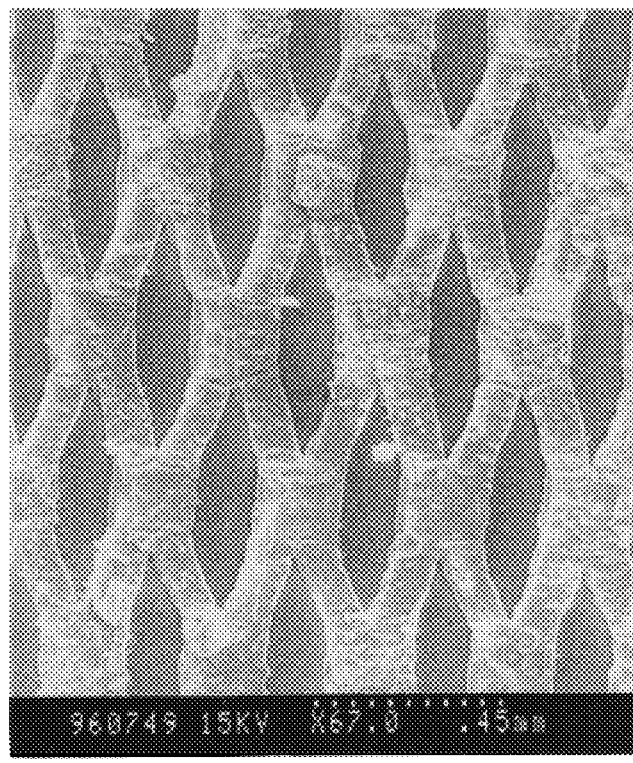
FIG. 5b is a reproduction of a picture taken with a scanning electron microscope of the same sheet as the one illustrated in FIG. 5a, except that it illustrates a larger surface showing the absence of folds or grooves.

In FIGS. 5a, 5b and 4c, the detail of the host structure after chemical reaction with lithium can be seen and in a second part it is noted that no channels have been formed during the insertion contrary to the case of Example 1 which does not permit a local absorption of the variation of volume and stress. The sheet remains perfectly flat which is an essential condition for a good operation of a polymer electrolyte generator with thin films. Another surprising effect of this test, which is notable with an electronic microscope (FIGS. 5a and 5b), is to realize that the formation of the alloy on the mesh from the structure of aluminum produces a lateral expansion of the dense part which is smaller that what would be expected from the values of Table 1. The expansion which is observed is about 10% while the expected value from Table 1 would be 94%. This phenomenon results from the directional nature of the source of lithium, which permits insertion, and from the solid nature of the device which has been produced. These observations suggest that an optimized structure of aluminum (EXMET®) should have an amount of perforations in the order of 20%.

Example 3

In the examples which follow, there is produced a complete generator having a surface of about 4 cm$^2$ made of the following films, illustrated for Example 3, by FIG. 6b: Al collector/(+)/SPE/Li°/C/H: aluminum collector 13 micrometers thick, a composite cathode, about 45 micrometers thick, comprising vanadium oxide, a carbon conductor and a binding polymer consisting of a copolymer based on ethylene oxide and a lithium salt $(CF_3SO_2)NLi$ in a mole ratio: O (of the polyether)/Li (of salt) of 30/1. The capacity of this cathode is about 4 coulombs per square centimeter. The separator is of the same nature as the binding agent and is 30 micrometers thick. This positive half-battery is mounted by pressing at 80° C. On the other hand, a lithium film is pressed at 80° C. against a thin film of a composite C about 10 micrometers thick mounted on a pealable propylene support for reasons of ease of handling. This coating of C is transferred while hot at 80° C. against an EXMET® sheet, represented by H, 25 micrometers thick, so as to facilitate electrical and ionic exchanges.

Finally, the positive half-battery is transferred at 80° C. on the lithium face of the assembly Li°/C/H and the generator thus produced (Type I) is kept at 60° C. for the following tests which will be described in the following example.

In this example, as well as in those which follow, about 20% excess aluminum is used with respect to the quantity of lithium which is present at the start, so as to leave part of the host structure in a non-reacted state in order to ensure a continuity of current collection in the plane of the sheet.

Example 4

In this example, the performance of the generator of Example 3 (Type I) is compared to an equivalent generator in which the anode is a simple sheet of lithium.

The initial curves of discharge are compared in FIG. 7 where it can be observed that the performance is similar but that the average voltage is lower. This voltage decrease corresponds to the lower activity of lithium in the alloy Li—Al, i.e. between about +270 mV and +420 mV vs Li°.

It is established that the performances during cycling (FIG. 10) of the generator using the alloyed anode according to the invention are stabilized and are comparable with what is known from generators utilizing metallic lithium. By way of reference, an identical generator utilizing a normal sheet of aluminum develops short circuits and loses some capacity already during the first cycles.

Example 5

This example includes the elements of Examples 3 and 4 except that the position of the film of carbon composite is different, as indicated in FIG. 6c. The curve of initial discharge is also compared to that of an equivalent battery having a lithium anode and illustrated in FIG. 9. The advantage of this device is to permit an assembly of the battery without activating it at that time. It is only when the reaction of formation of the alloy is completed that the battery reaches its full potential capacity, which makes the operation of assembling the battery even safer.

Example 6

In this example, a test is made to illustrate an important characteristic of the invention with respect to safety.

The battery used is one corresponding to the device of Example 5 which is illustrated in FIG. 6c for a comparative test of thermal stability with an identical battery having a metallic lithium anode.

The technique used is known under the name ARC (Accelerated Rate Calorimetry) (Columbia Scientific, Austin, Tex. U.S.A.) and successively raises the temperature of the sample at increasingly high temperatures until a spontaneous thermal reaction between the elements of the battery produces additional heat (stabilization of the temporary rise in temperature). This is a technique which is sensitive and is known to localize exothermic reactions which can present a danger under abusive conditions of use.

Comparative calorimetry tests ARC between: a complete Type II cell according to the invention as prepared in Example 5 and weighing about 0.5157 g, a sample comprising a film of polymer electrolyte identical to the previous test and a film of metallic lithium 22 micrometers thick.

With the sample illustrated in FIG. 8, the curve of temperature rise indicates no self-heating effect in the entire range of temperature under study, even when dealing with a complete battery.

Under similar conditions, the sample of FIG. 8a) without cathode and with metallic lithium shows an exothermic state which is visible towards 255° C., i.e. above the melting temperature of lithium, about 180° C. A complete sample, i.e. also containing a cathode, sometimes shows a high exothermic state resulting from a short circuit following the melting of lithium.

This test is a good indication of the effect of the invention from the point of view of safety inasmuch as it is possible to produce an anode of alloyed lithium, which is non fusible, is in the form of a thin and dense film, and which thus produces a generator which is completely in solid state at temperatures higher than 300° C.

Example 7

In this example, there is used the device illustrated in FIG. 6d in which the source of lithium originates from the cathode prepared in discharged state. Vanadium oxide is replaced in this case with pre-inserted cobalt oxide prepared by synthesis.

FIG. 11 shows the evolution during cycling of the voltage of this battery with a monoface anode prepared with a composite film C of Type II and corresponding to the following assembly:

Al collector/$LiCoO_2$/SPE/C/H.

Example 8

In this example, a battery was assembled by flat co-winding the following films in double biface configuration, such as illustrated in FIGS. 6e, 12b and 12d. In the figures, the films of C are not shown as applied on each face of the host structure.

SPE/(+)/Al collector/(+)/SPE and
LI°,C/H/C and Li° in contact during assembly.

The assembly is pressed at 40° then at 80° C. for half an hour so as to complete the formation of the alloy.

Lateral contacts are obtained by pulverizing copper by the technique of Shooping (CA 2,068,290) on the lateral protrusions of the aluminum collector of the cathode and on the lateral protrusion of the non-reacted aluminum host metal of the anode.

The electrochemical performance of the assembly is equivalent to that of the battery 4 cm$^2$ illustrated in Examples 3 and 4, all proportions being considered for the surfaces in use.

Example 9

In this example, from the device of FIG. 3, there is shown the performance of a thin sheet of copper perforated with a laser, during the formation of the alloy of composition~$Li_4Sn$. In spite of the rough preparation of the sheet, it is observed that any deformation in the plane of the sheet is removed during the insertion.

| NON-FUSIBLE ANODES | | | | | |
|---|---|---|---|---|---|
| Before | | | After | | |
| Discharged anodes | cm3/Ah | cm3/C (xE-4) | Charged anodes | cm3/Ah | cm3/C (xE-4) | Variation Cm3/Ah |
| Li | 0.49 | 1.36 | Li | 0.49 | 1.36 | 0 |
| C | 1.19 | 3.32 | $LiC_6$ | 1.47 | 4.09 | 23 |
| Si | 0.11 | 0.30 | $Li_{21}Si_5$ | 0.44 | 1.22 | 309 |
| As | 0.16 | 0.45 | $Li_3As$ | 0.49 | 1.36 | 201 |
| Al | 0.37 | 1.04 | LiAl | 0.72 | 2.01 | 94 |
| Sn | 0.14 | 0.40 | $Li_{21}Sn_5$ | 0.51 | 1.43 | 257 |
| Sb | 0.23 | 0.63 | $Li_3Sb$ | 0.56 | 1.55 | 147 |
| Pb | 0.15 | 0.43 | $Li_{22}Pb_5$ | 0.52 | 1.44 | 237 |

T-1: Table illustrating the volumetric expansion of different alloys calculated according to the reference: R. Nesper. Prog. Solid St. Chem., Vol. 20, pp. 1–45, 1990.

It is obvious that modifications obvious to one skilled in the art are possible without departing from the scope of the present invention, provided of course that they generally fall within the scope of the appended claims.

We claim:

1. An electrochemical generator comprising thin films including a positive electrode and its collector, and a sheet of a host metal to constitute a negative electrode, as well as an electrolyte which is conductive towards alkali ions and also means constituting a source of alkali ions, characterized in that said sheet of host metal before formation of an alloy during a charge is formed with perforated voids which extend through the entire thickness of the host metal, the quantity of voids and their arrangement in said sheet of host metal being capable of absorbing in said voids any lateral expansion of said sheet of host metal, thus substantially preventing any cumulative change in the plane of said sheet of host metal when there is initial formation of alloy in said sheet between said host metal and an alkali metal brought about by said alkali ions.

2. A generator according to claim 1, in charged state, characterized in that said sheet is converted into an alloy comprising said host metal and said alkali metal.

3. A generator according to claim 1, characterized in that the source of alkali ions consists of a sheet of alkali metal which is in contact with said sheet of host metal, the alkali metal originating from said source of alkali ions being alloyed with said host metal when the generator is in charged state.

4. A generator according to claim 1, characterized in that the source of alkali ions is found in the positive electrode, the alkali metal originating from said source of alkali ions being alloyed with said host metal when the generator is in charged state.

5. A generator according to claim 1, characterized in that the source of alkali ions is a sheet of alkali metal which is in contact with said sheet of host metal and is also found in the positive electrode, the alkali metal originating from said sheet of alkali metal and from said source of alkali ions being alloyed with the said host metal when the generator is in charged state.

6. A generator according to claim 1, in which the alkali metal is lithium.

7. A generator according to claim 1, in which the host metal consists of a metal capable of forming alloys of high activity in alkali metal and in which diffusion of the alkali metal is rapid.

8. A generator according to claim 7, in which the alloys of high activity in alkali metal have a potential comprised between 0 and +1.5 volts with respect to the potential of the pure alkali metal.

9. A generator according to claim 1, in which the main component of the host metal is selected from Al, C, Sn, Pb, Ag, Si, Zn, Mg or combinations thereof.

10. A generator according to claim 1, in which the voids in the sheet of host metal represent between about 5 and 80% of the total mass of said sheet of host metal.

11. A generator according to claim 10, in which the voids in the sheet of host metal represent between about 5 and 30% of the mass of said sheet of host metal.

12. A generator according to claim 1, in which the voids are in the form of a grid.

13. A generator according to claim 1, in which the sheet having voids is in the form of a grid.

14. A generator according to claim 1, in which the sheet having voids is in the form of expanded metal is obtained by cutting—stretching and possibly relaminating.

15. A generator according to claim 1, in which the electrolyte which is conductive towards alkali ions comprises a polymer electrolyte.

16. A generator according to claim 1, in which the electrolyte which is conductive towards alkali ions comprises a polymer matrix, a liquid electrolyte, as well as a salt which is at least partially soluble in the liquid electrolyte.

17. A generator according to claim 1, in which the voids are arranged to substantially compensate for any linear expansion, resulting from the formation of the alloy, in the plane of the sheet of host metal.

18. A generator according to claim 1, in which the sheet of host metal includes a layer of polymer electrolyte on at least one of its faces, said layer being disposed on said sheet of host metal to maximize ionic exchanges between the alloy and the electrolyte which is conductive towards alkali ions and act as separator between the negative electrode and the positive electrode.

19. A generator according to claim 18, in which the polymer electrolyte contains carbon distributed in said polymer electrolyte to act as an electronic conduction additive, and maximize ionic and electronic exchanges.

20. A generator according to claim 3, in which the sheet of alkali metal is present on one side only of the sheet of host metal.

21. A generator according to claim 3, in which the sheet of alkali metal is present on both sides of the sheet of host metal.

22. A generator according to claim 2, in which the alloy is obtained during assembly of the generator.

23. A generator according to claim 2, in which the alloy is obtained during a reaction of activation following assembly of the generator.

24. A generator according to claim 3, in which the sheet of alkali metal is located on the face of the sheet of host metal which is opposite the positive electrode, to delay formation of alloy after assembling the generator and to maximize the safety of the procedures of assembling the generator.

25. A generator according to claim 1, in which the host metal is in an excess amount with respect to the alkali metal to leave part of the host metal non-reacted thereby enabling it to act as a current collector on the plane of the sheet of host metal.

26. A generator according to claim 1, consisting of films cylindrically or flat wound, or stacked flat.

27. A generator according to claim 19, in which the sheet of host metal and the collector of the positive electrode protrude on each side of the cylindrically or flat wound or stacked films so as to permit an efficient connection along the entire lateral edge respectively of the collector and of the sheet of host metal.

28. A generator according to claim 27, in which the connection is obtained by pulverizing a conductor metal on said lateral edge of the sheets.

29. A generator according to claim 3, in which the alloy sheet of negative electrodes is obtained after assembling said generator by thermal treatment of said sheet of host metal and of said sheet of alkali metal in contact with said sheet of host metal, said thermal treatment being carried out under pressure or by mechanical confinement and under conditions ensuring maintenance of the planar condition of the sheet of negative electrode.

30. A generator according to claim 1, in which the sheet of host metal has a thickness between about 1 and 150 $\mu$m.

31. A generator according to claim 30, in which the sheet of host metal has a thickness between about 10 and 100 $\mu$m.

32. A method of preparing an electrochemical generator which comprises preparing thin films including a positive electrode and its collector, and a sheet of a host metal to constitute a negative electrode as well as an electrolyte which is conductive towards alkali ions, and also means consisting of a source of alkali ions and placing the negative electrode and said sheet on either part of said conductive electrolyte, wherein said sheet is selected from a sheet of a host metal which before formation of an alloy during charge having perforated voids which extend through the entire thickness of the host metal, the quantity of voids and their arrangement in said sheet of host metal being capable of absorbing in said voids any lateral expansion of said sheet of host metal and thus to substantially prevent any cumulative change in the plane of said sheet of host metal when there is initial formation of alloy in said sheet between said host metal and an alkali metal brought about by said alkali ions, and thereafter assembling the films, the conductive electrolyte and the source of alkali ions to constitute said generator.

33. A method according to claim 32, comprising charging the generator so that said sheet then becomes an alloy comprising said host metal and said alkali metal.

34. A method according to claim 33, characterized in that said sheet of host metal is contacted with a sheet of alkali metal after which the generator is charged, the alkali metal being then alloyed with said host metal.

35. A method according to claim 32, characterized in that the source of alkali ions is localized in the positive electrode, and the generator is then electrochemically charged, the alkali metal originating from said source of alkali ions being alloyed with said host metal.

36. A method according to claim 32, characterized in that said sheet of host metal is contacted with a sheet of alkali metal and, in addition, another source of alkali ions is introduced into the positive electrode, and the generator is then electrochemically charged, the alkali metal originating from the sheet of alkali metal and from said source of alkali ions being alloyed with said host metal.

37. A method according to claim 32, in which the alkali metal is lithium.

38. A method according to claim 32, in which the host metal consists of a metal capable of forming alloys with highly active alkali metal and in which diffusion of the alkali metal is rapid.

39. A method according to claim 38, in which the alloys of high activity in alkali metal have a potential between 0 and +1.5 volts with respect to the potential of pure alkali metal.

40. A method according to claim 32, in which the main component of the host metal is selected from Al, C, Sn, Pb, Ag, Si, Zn, Mg or combinations thereof.

41. A method according to claim 32, in which the voids of the sheet of host metal represent between about 5 and 80% of the total mass of said sheet of host metal.

42. A method according to claim 41, in which the voids of the sheet of host metal represent between about 5 and 30% of the mass of said sheet of host metal.

43. A method according to claim 32, in which the voids are in the form of a grid.

44. A method according to claim 32, in which the sheet having voids is in the form of a grid.

45. A method according to claim 32, in which the sheet of host metal is treated by cutting—stretching and eventually relaminating to obtain said sheet presenting voids in the form of expanded metal.

46. A method according to claim 32, in which the electrolyte which is conductive towards alkali ions comprises a polymer electrolyte.

47. A method according to claim 32, in which the electrolyte which is conductive towards alkali ions comprises a polymer matrix, a liquid electrolyte, as well as a salt which is at least partially soluble in the liquid electrolyte.

48. A method according to claim 32, characterized in that there is introduced a layer of polymer electrolyte on the sheet of host metal, on at least one face thereof, and that said layer is disposed on said sheet of host metal so as to maximize ionic exchanges between the alloy and the electrolyte which is conductive towards alkali ions and act as separator between the negative electrode and the positive electrode.

49. A method according to claim 48, characterized in that carbon is introduced in the polymer electrolyte and that the latter is distributed in said polymer electrolyte to act as an additive of electronic conduction, thereby maximizing ionic and electronic exchanges.

50. A method according to claim 34, in which the sheet of alkali metal is disposed on only one side of the sheet of host metal.

51. A method according to claim 34, in which the sheet of alkali metal is disposed on the two sides of the sheet of host metal.

52. A method according to claim 33, in which the alloy is produced when assembling the generator.

53. A method according to claim 33, characterized in that a reaction of activation is carried out following the assembly of the generator to obtain the alloy.

54. A method according to claim 34, characterized in that the sheet of alkali metal is disposed on the face of the sheet of alkali metal which is opposite the positive electrode, to delay the formation of alloy after assembling the generator and to maximize the safety of the procedures for assembling the generator.

55. A method according to claim 32, in which the host metal is in excess quantity with respect to the alkali metal to leave part of the host metal non-reacted, enabling it to act as a current collector on the plane of the sheet of host metal.

56. A method according to claim 32, which comprises cylindrically winding the films, winding them flat, or stacking them flat.

57. A method according to claim 56, which is carried out in such a manner that the sheet of host metal and the collector of the positive electrode protrude on both sides of the cylindrically or flat wound or stacked flat films so as to enable efficient connection on any lateral edge respectively of the collector or the sheet of host metal.

58. A method according to claim 57, in which the connection is obtained by pulverizing conductor metal on said lateral edge of the sheets.

59. A method according to claim 33, characterized in that the alloy sheet of negative electrode is obtained after assembling said generator by thermal treatment of said sheet of host metal and said sheet of alkali metal in contact with said sheet of host metal, said thermal treatment being carried out under pressure or by mechanical confinement and under conditions insuring maintenance of the planar condition of the sheet of negative electrode.

60. A method according to claim 32, characterized in that the sheet of host metal has a thickness between about 1 and 150 $\mu$m.

61. A method according to claim 60, characterized in that the sheet of host metal has a thickness between about 10 and 100 $\mu$m.

\* \* \* \* \*